(12) United States Patent  (10) Patent No.: US 6,725,151 B2
Itou  (45) Date of Patent: Apr. 20, 2004

(54) FUEL CELL VEHICLE AND METHOD FOR PREDICTING POSSIBLE RUNNING DISTANCE

(75) Inventor: Yasuyuki Itou, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/351,322

(22) Filed: Jan. 27, 2003

(65) Prior Publication Data

US 2003/0150655 A1 Aug. 14, 2003

(30) Foreign Application Priority Data

Feb. 13, 2002 (JP) ........................................ 2002-035247

(51) Int. Cl.$^7$ ............................................... G01C 21/00
(52) U.S. Cl. ....................................... 701/123; 280/834
(58) Field of Search ................................ 701/123, 117, 701/22, 24, 36; 702/63; 290/40 C; 180/65.5, 65.3, 65.8; 280/834

(56) References Cited

U.S. PATENT DOCUMENTS 6,158,537 A * 12/2000 Nonobe ..................... 180/65.3
6,555,928 B1 * 4/2003 Mizuno et al. ........... 290/40 C
6,625,539 B1 * 9/2003 Kittell et al. ................ 701/213

FOREIGN PATENT DOCUMENTS

JP  2000-292195  10/2000
JP  2001-231109  8/2001

* cited by examiner

*Primary Examiner*—Richard M. Camby
(74) *Attorney, Agent, or Firm*—McDermott, Will & Emery

(57) ABSTRACT

A fuel cell vehicle comprises a fuel cell system (50), a fuel tank (12) which stores fuel supplied to the fuel cell system (50), and a sensor (22) which detects a remaining fuel amount in the fuel tank (12). A controller (23) of the fuel cell system (50) predicts a possible running distance of the vehicle based on an energy amount obtained by subtracting the energy required to start the fuel cell system (50) from the energy amount corresponding to the detected remaining fuel amount.

15 Claims, 8 Drawing Sheets

FUEL CELL VEHICLE AND METHOD FOR PREDICTING POSSIBLE RUNNING DISTANCE

FIELD OF THE INVENTION

The present invention relates to a fuel cell vehicle, and in particular to a technique for estimating a possible running distance.

BACKGROUND OF THE INVENTION

JP 2000-292195A published by the Japanese Patent Office in 2000 and JP 2001-231109A published by the Japanese Patent Office in 2001 disclose a fuel cell vehicle wherein a remaining fuel amount supplied to a fuel cell is detected, a possible running distance is displayed, and the driver is warned when the remaining fuel is low and the running distance is short.

SUMMARY OF THE INVENTION

However, in this related art, the vehicle's possible running distance is estimated by considering the remaining fuel amount only, and the fuel amount required to restart the fuel cell system when the vehicle stops and the fuel cell system has stopped, is not considered. When the system has stopped, fuel is consumed to restart the fuel cell system, so the actual possible running distance is shorter than the estimated possible running distance. In particular, if the outside air temperature falls when the vehicle is stationary and it is necessary to warm up the fuel cell when the vehicle restarts, the actual possible running distance is even shorter than the estimated possible running distance.

It is therefore an object of this invention to precisely estimate a possible running distance of the fuel cell vehicle also taking account of restarting the vehicle, and to give the driver adequate warning of when fuel must be supplied.

In order to achieve above object, this invention provides a fuel cell vehicle, comprising a fuel cell system, a fuel tank which stores fuel supplied to the fuel cell system, and a controller which functions to predict a possible running distance of the vehicle based on an energy amount obtained by subtracting an energy required to start the fuel cell system, from an energy amount corresponding to a remaining fuel amount in the fuel tank.

According to an aspect of the invention, this invention provides a method for predicting a possible running distance of a fuel cell vehicle provided with a fuel cell system, comprising detecting a remaining fuel amount in a fuel tank which stores fuel supplied to the fuel cell system, and predicting a possible running distance of the vehicle based on an energy amount obtained by subtracting an energy amount required to start the fuel cell system, from an energy amount corresponding to the detected remaining fuel amount.

The details as well as other features and advantages of this invention are set forth in the remainder of the specification and are shown in the accompanying drawings.

DESCRIPTION OF THE PREFERRED EMBODIMENTS

Figure 1:
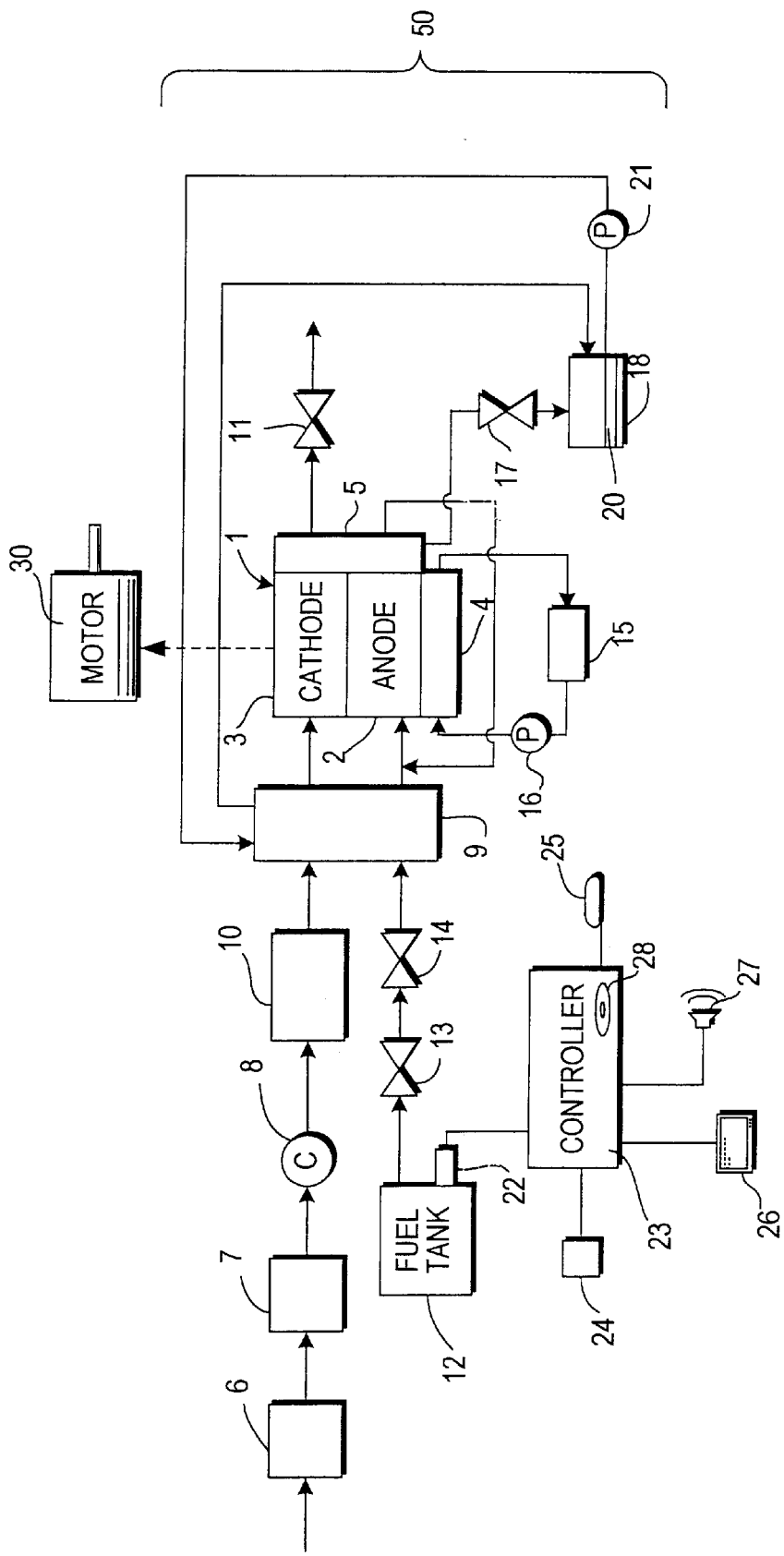
FIG. 1 is a diagram showing a schematic construction of the fuel cell vehicle according to this invention.

FIG. 1 of the drawings shows a schematic construction of a fuel cell system 50 of a fuel cell vehicle according to this invention. The fuel cell system 50 is based on a fuel cell 1, the fuel cell 1 comprising an ion permeable solid polymer electrolyte membrane, an anode 2 which is a fuel electrode supporting a catalyst, a cathode 3 which is an air electrode supporting a catalyst, a cooling water passage 4 for cooling these electrodes, and an air-liquid separator 5 which separates water in the exhaust gas.

Air from which dust has been removed by a filter 6, is compressed by a compressor 8, humidified to a predetermined humidity by a humidifier 9, and supplied to the cathode 3. When air is compressed by the compressor 8, the temperature of the air rises, so a cooler 10 is installed to cool the air to a predetermined temperature downstream of the compressor 8. The air flowrate supplied to the cathode 3 is detected by a flowrate sensor 7. The air supplied to the cathode 3 is used for generating power, and discharged from the cathode 3. After its pressure is adjusted by a pressure-regulating valve 11, it is then discharged to the outside of the fuel cell system 50.

Also, fuel from a fuel tank 12 is supplied to the humidifier 9 via a pressure-regulating valve 13 which adjust the fuel pressure and a control valve 14 which controls the fuel flowrate. After its humidity is adjusted, it is then supplied to the anode 2. The fuel supplied to the anode 2 is used for power generation, and discharged fuel gas is again supplied to the anode 2 and recirculated in the fuel cell 1.

When fuel and air are respectively supplied to the anode 2 and cathode 3, the fuel cell 1 generates power. A motor 30 is driven by the power generated by the fuel cell 1, the wheels connected to the motor 30 rotate, and the vehicle runs.

A first water tank 15 which stores cooling water to cool the fuel cell 1, is connected to the fuel cell 1. When a first pump 16 is driven, cooling water is supplied from the first water tank 15 to the fuel cell 1.

The water separated by the air-liquid separator 5 is supplied to a second water tank 18 via a shutoff valve 17 and is stored therein. A heater 20 for heating the water stored in the second tank 18 is provided. The water heated by the heater 20 is supplied to the humidifier 9 by the second pump 21, and used to humidify the air and fuel.

A fuel amount detection sensor 22 which detects the fuel amount remaining in the fuel tank 12 is installed in the fuel tank 12. The output of the sensor 22 is sent to a controller 23. The controller 23 comprises one, two or more microprocessors, a memory, an input/output interface, and a medium 28 which records map information including the locations of fuel stations. In addition to the remaining fuel amount, signals are input to the controller 23 from an outside temperature sensor 24, and a GPS receiver 25 which receives position information about the vehicle from satellites. When the remaining fuel amount has become low as described hereafter, a warning message is displayed on a display 26, or a warning message or an alarm is played on a speaker 27, advising the driver to refuel.

Figure 2:
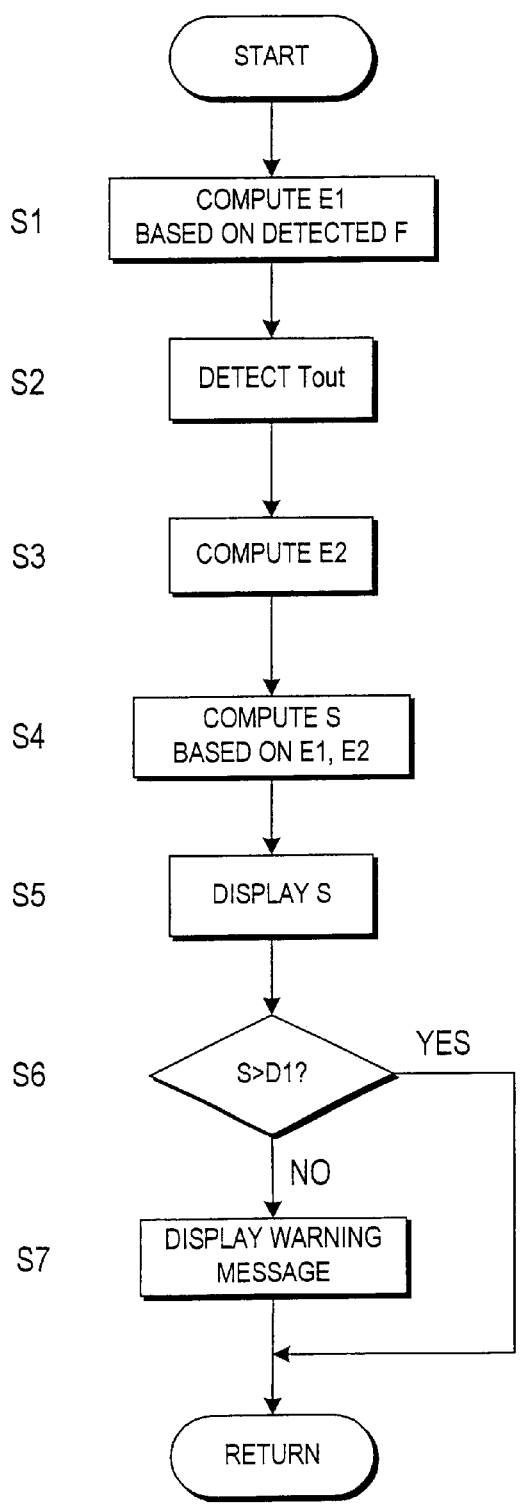
FIG. 2 is a flowchart showing the control performed by a controller.

FIG. 2 is a flowchart for describing the control performed by the controller 23, and it is executed at a predetermined time, for example every 10 milliseconds.

First, in a step S1, a remaining fuel amount F [1] is detected by the fuel amount detection sensor 22, and a remaining energy amount E1 [kcal] corresponding to the remaining fuel amount F is computed based on the remaining fuel amount F.

In a step S2, an outside temperature Tout [° C.] is detected based on a signal from the outside temperature sensor 24. In a step S3, an energy amount E2 [kcal] required to restart the fuel cell system 50 is computed from the detected outside temperature Tout. E2 is the energy amount required until the fuel cell system 50 is able to change from the stop state to the state where it is able to generate sufficient power. The energy amount E2 is for example computed by the controller 23 which stores a value as a reference energy amount required to start the fuel cell system 50 at a reference outside temperature, and corrects the reference energy amount according to the difference between the reference temperature and the detected outside temperature Tout.

In a step S4, a possible running distance S [km] is computed based on the energy amounts E1, E2. The possible running distance S may be computed by calculating the energy amount E3 [kcal] available for running of the vehicle by subtracting the energy amount E2 for restarting from the remaining energy amount E1, and then dividing this energy amount E3 by, for example, an average fuel consumption Cav [kcal/km] predetermined by experiments.

In a step S5, the possible running distance S is displayed on the display 26, and the driver is thus informed of the possible running distance S. When the possible running distance S is shorter than a predetermined running distance D1 [km] (e.g., 50 km), the routine proceeds to a step S7 from a step S6 and a warning message is displayed to the driver on the display 26 as to the need to refuel. In addition to or instead of displaying a warning message, an audio message or alarm may be played on the speaker 27 to advise the driver to refuel.

Due to this control, the fuel cell system 50 can warn the driver about refuel before the fuel runs out, and the fuel cell system 50 can be prevented from becoming unintentionally inoperable. Also, the energy required to restart the fuel cell 1 is computed taking account of the outside temperature, so the energy required to restart is computed with high precision, and the estimation precision of the possible running distance is improved.

Figure 3:
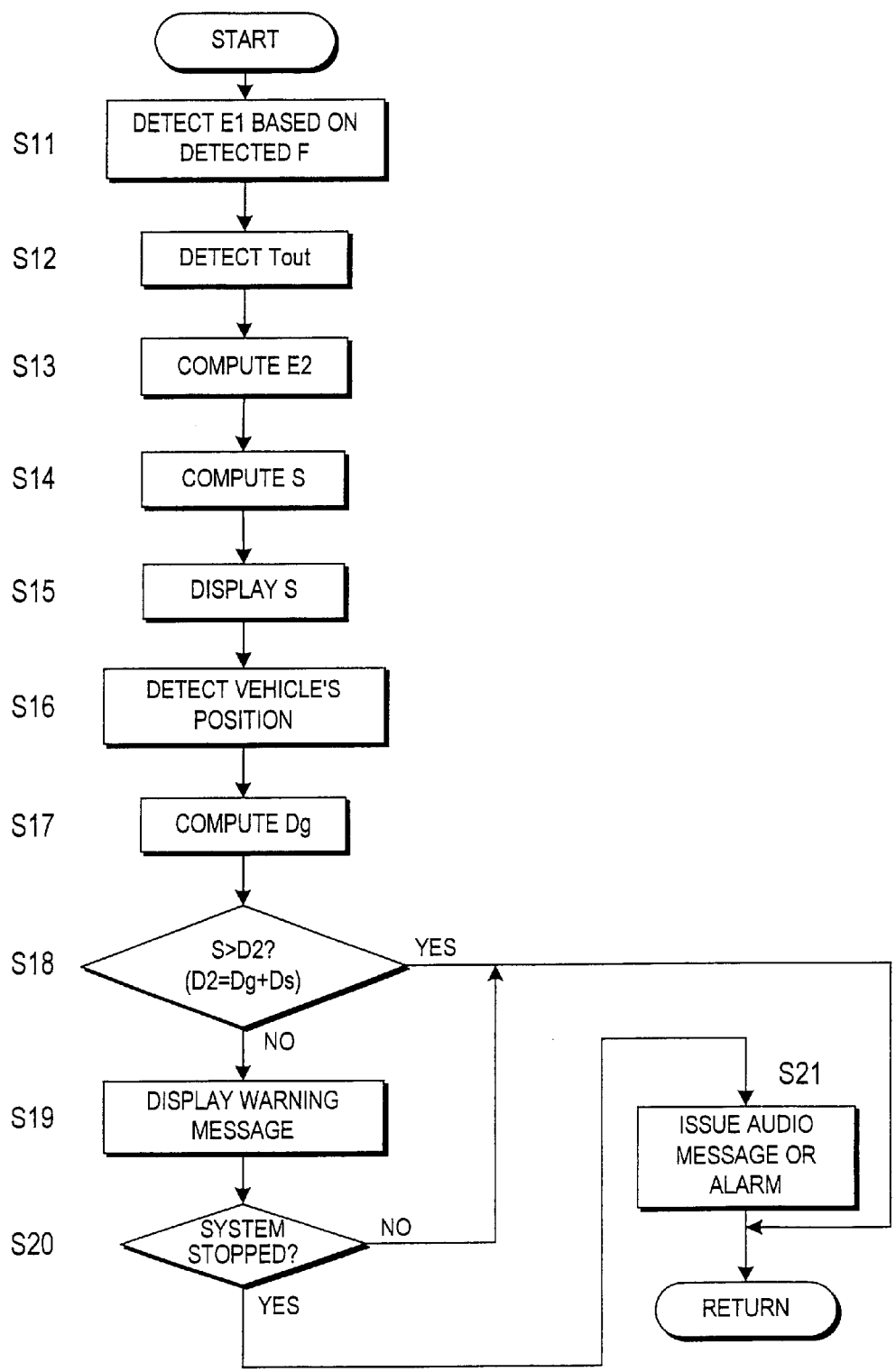
FIG. 3 is a flowchart showing another example of the control performed by the controller.

FIG. 3 is a flowchart showing the details of another control performed by the controller 23, which is executed instead of the control shown in FIG. 2. In the control shown in FIG. 3, the location of the nearest fuel station is detected by looking up map information recorded on the recording medium 28 in the controller 23, based on vehicle position information received from the GPS receiver 25, and the driver is alerted in view of the distance to that location.

The processing from the steps S11 to S15 is identical to the processing from the steps S1 to S5 of FIG. 2. The remaining energy amount E1 is computed in the step S11, the outside temperature Tout is detected in the step S12, and the energy amount E2 required for restarting is computed in the step S13. In the step S14, the possible running distance S is computed based on the energy amounts E1, E2, and in the step S15, the possible running distance S is displayed on the display 26.

In a step S16, the vehicle's position is detected based on the signal received from the GPS receiver 25, and in the step S17, a distance Dg [km] to the nearest fuel station from the vehicle's position is computed based on the vehicle's position and map information stored on the recording medium.

In a step S18, a value D2 obtained by adding a predetermined extra distance Ds [km] (e.g., 10 km) to the distance Dg to the fuel station, is compared with the estimated possible running distance S. When the distance D2 is longer than the possible running distance S, the routine proceeds to a step S19, and when it is shorter, the control is terminated. The possible running distance S is computed taking account of the energy amount E2 required for restarting, so when a restart is not performed, the distance obtained by adding the possible running distance with the energy amount E2 to the extra distance Ds, is the actual extra distance.

In a step S19, to encourage the driver to refuel, a warning message to supply fuel is displayed on the display 26.

In a step S20, it is determined whether the vehicle has stopped and the fuel cell system 50 has stopped with the warning message to refuel still displayed. When the fuel cell system 50 has not stopped, the control is terminated.

When the fuel cell system 50 has stopped with the warning message still displayed, the routine proceeds to a step S21, an audio message or alarm is issued from the speaker 27 to demand refuel, and the driver is informed that the fuel may run out if the vehicle consumes energy for warm-up or next restart. Hence, the driver can be advised that the fuel may run out by sound even if the driver misses the warning message displayed on the display 26. Then fuel does not run out if the driver realizes there is a risk that fuel may run out on next restart, restarts the fuel cell system immediately without consuming the energy for warm-up and drive to the fuel station for refuel. Otherwise, fuel is consumed to warm up the fuel cell system 50 on the next restart so that the running distance becomes shorter and fuel may run out.

In the step S21, the driver may also be advised that water in the fuel cell system 50 is removed outside the system. By removing water in the fuel cell system 50, the energy amount (fuel amount) required to warm up on the next startup is reduced, and the possible running distance is correspondingly increased. The second water tank 18 may be made like a removable cartridge type for example, and the water in the fuel cell system 50 may be removed, removing the second water tank 18 after the fuel cell system 50 has stopped, and taking it outside the vehicle.

Figure 4:
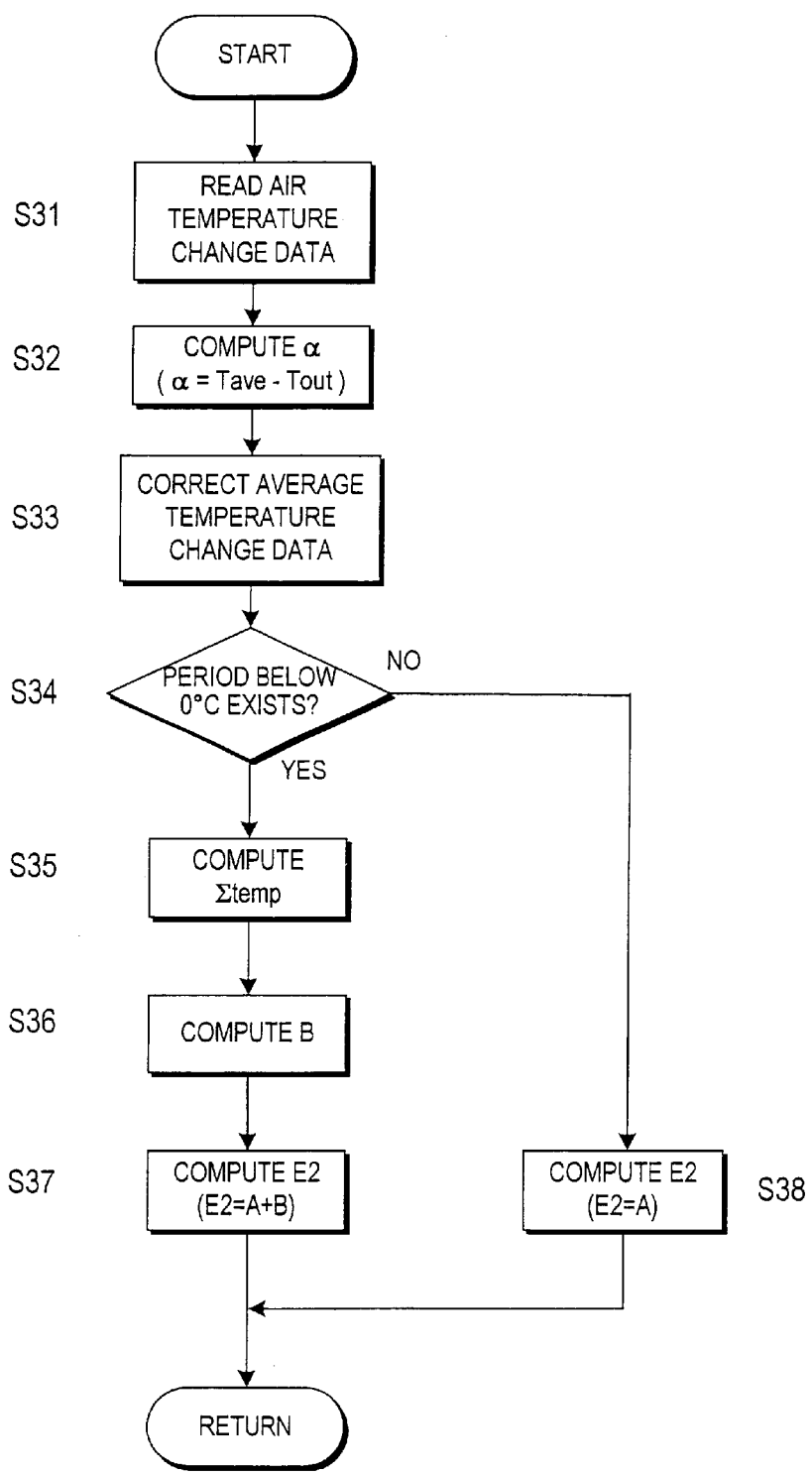
FIG. 4 is a flowchart showing a vehicle restart energy computation performed by the controller.

The flowchart shown in FIG. 4 shows another example of the invention used to compute the energy required for restarting after the system has stopped. This flowchart is executed in the step S3 of FIG. 2 or the step S13 of FIG. 3. In the computation, the energy amount E2 required for restarting is computed by assuming that, when the vehicle stops, it will not be restarted until at least the next day.

Figure 5:
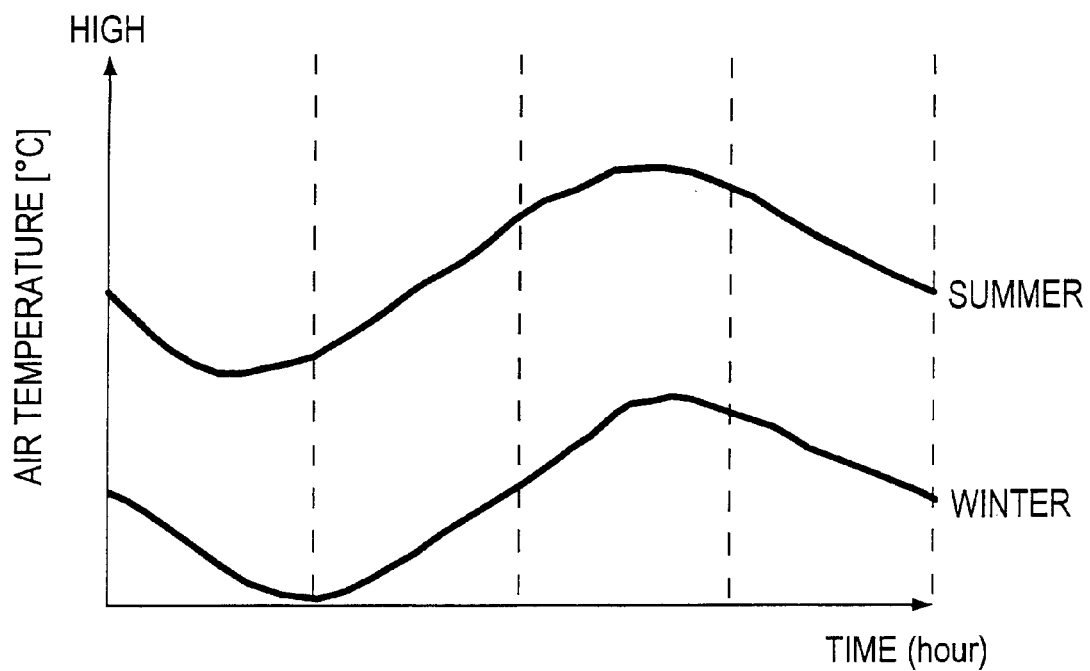
FIG. 5 is a diagram showing an example of summer and winter temperature change data.

First, in a step S31, air temperature change data for the current season are read. The air temperature change data are obtained by plotting the average air temperature at each hour as shown in FIG. 5, and are prepared for each season. The reason why the air temperature change data are prepared for each season is that the time at which the air temperature is a maximum or minimum is different depending on differences in sunrise and sunset. However the air temperature change data can be prepared only for summer and winter, and the air temperature change data for spring and autumn can be estimated from the air temperature change data for summer and winter. Alternatively, air temperature change data can be prepared for each month instead of each season. For a vehicle used in a country where there is little or no change according to the season, one set of air temperature change data is probably sufficient.

In a step S32, a difference α between an average air temperature Tave [° C.] at the present time obtained by looking up the air temperature change data for the current season, and the present air temperature Tout detected by the outside air temperature sensor 24, is computed.

Figure 6:
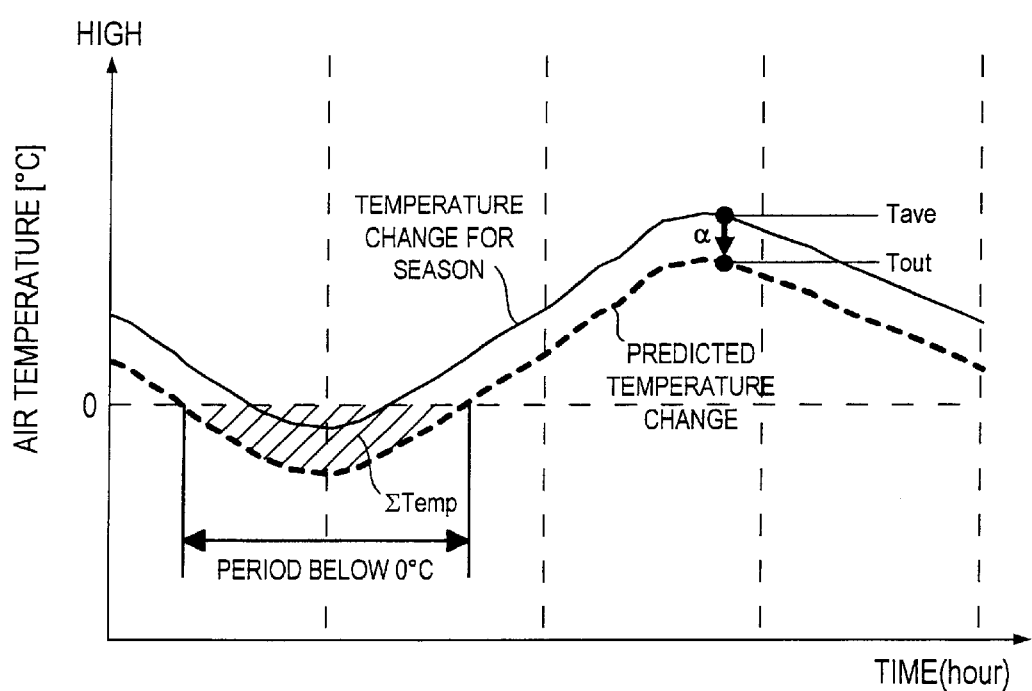
FIG. 6 is a diagram for describing a process for estimating temperature change.

In a step S33, the air temperature change data read in the step S31 are shifted by the difference a computed in the step S32 as shown in FIG. 6 so as to predict the air temperature change for one day. FIG. 6 shows the case where the present air temperature Tout is lower than the average air temperature Tave.

In a step S34, it is determined whether or not a period during which the air temperature is below 0° C. exists by looking up the predicted air temperature change for one day. When a period during which it is below 0° C. exists, the routine proceeds to a step S35, otherwise it proceeds to a step S38.

In the step S35, the air temperature is integrated over the period during which the air temperature is below 0° C., and Σtemp [° C.·hour] is computed. Σtemp corresponds to the area of the region (shaded region) enclosed by the 0° C. line and temperature change line in FIG. 6.

Figure 7:
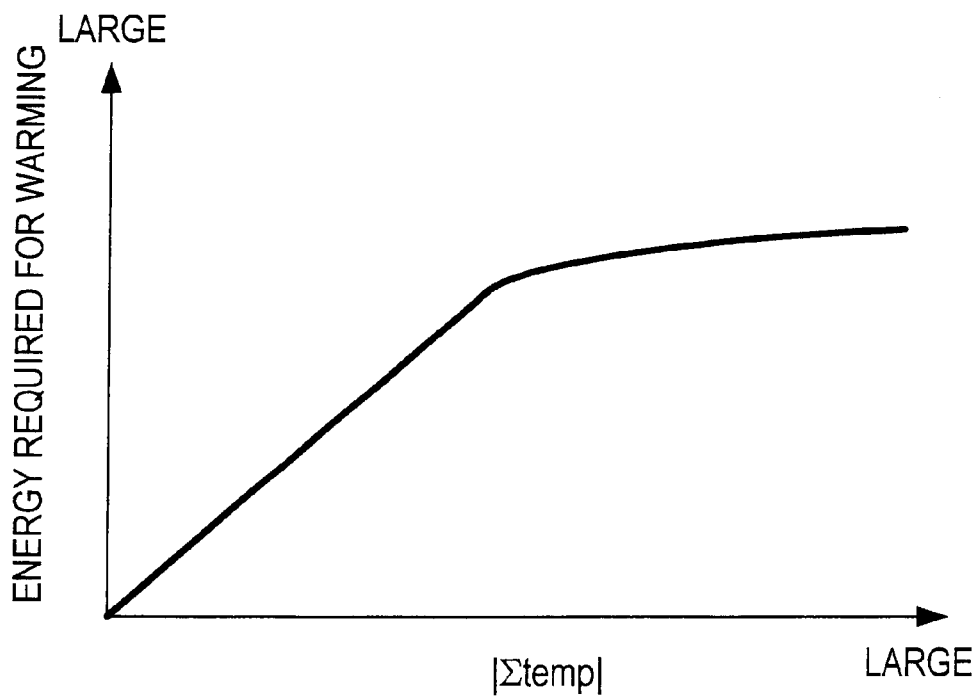
FIG. 7 is a table for estimating an energy increase amount required for warmup.

In a step S36, an energy increase amount B [kcal], which is required to keep water in the second water tank 18 above freezing point by the heater 2, is computed by looking up a table shown in FIG. 7 based on the absolute value of Σtemp. Because the heat released from the second water tank 18 increases as the difference of air temperature from the freezing point is larger, the energy increase amount B to keep warm is also computed to be larger, as the absolute value of Σtemp is larger.

In a step S37, the energy increase amount B required for keeping warm, is added to the minimum required energy A [kcal] when the fuel cell system 50 is started, to compute the energy amount E2 required for restarting. The minimum required energy A is for example the energy required to start the fuel cell system 50 at ordinary temperature, and warm up the fuel cell system 50.

On the other hand, when a period during which the air temperature is below 0° C. does not exist, the routine proceeds to a step S38, and the minimum required energy A is computed as the energy amount E2 required for restarting.

Figure 8:
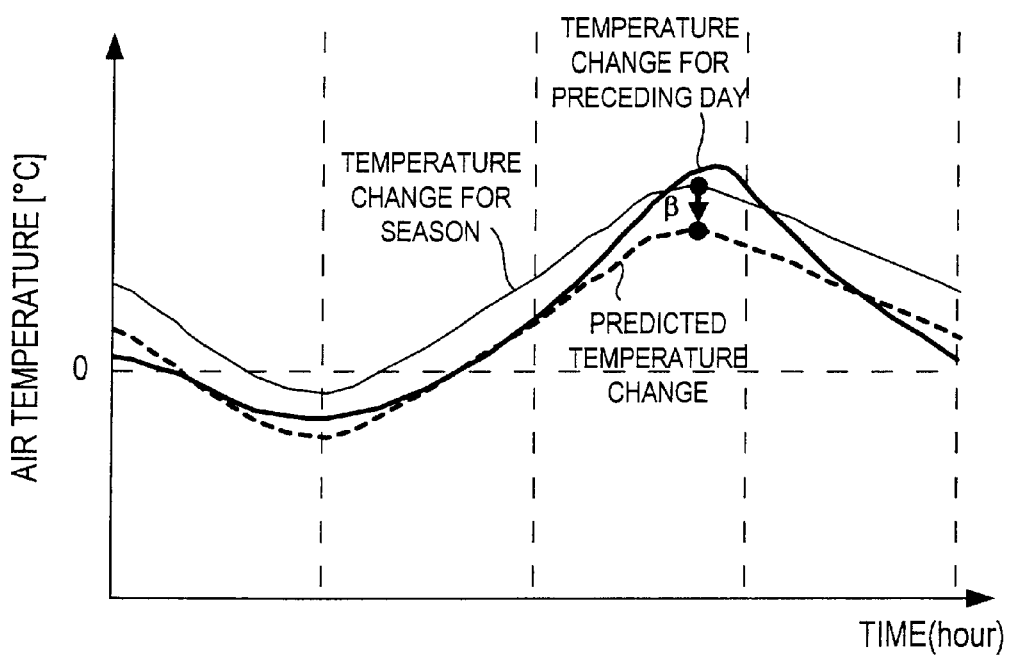
FIG. 8 is a diagram for describing another example of a process for estimating temperature change.

Herein, the air temperature change was predicted by correcting air temperature change data for each season based on the present air temperature, however a difference β between the average air temperature for the preceding day or the average air temperature for several preceding days, and the average air temperature for each season, can be computed, and the air temperature change predicted by shifting the air temperature change data for each season by β. In this case, the difference β is computed in the step S32 instead of the difference a. FIG. 8 is a diagram shown the case where the air temperature change is predicted by correcting the air temperature change data for each season based on the average value of air temperatures for the preceding day. According to this method, the air temperature change can be precisely predicted regardless of whether the present air temperature happens to be high or low due to the climate or vehicle's position.

The entire contents of Japanese Patent Application P2002-35247 (filed Feb. 13, 2002) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A fuel cell vehicle, comprising:
   a fuel cell system;
   a fuel tank which stores fuel supplied to the fuel cell system;
   a sensor which detects a remaining fuel amount in the fuel tank; and
   a controller which functions to:
   predict a possible running distance of the vehicle based on an energy amount obtained by subtracting an energy required to start the fuel cell system, from an energy amount corresponding to the detected remaining fuel amount.

2. The fuel cell vehicle as defined in claim 1, wherein:
   the controller further functions to give advice to refuel when the predicted possible running distance is less than a predetermined running distance.

3. The fuel cell vehicle as defined in claim 1, further comprising:
   a sensor which detects an outside air temperature; and
   the controller further functions to predict the energy required to start the fuel cell system based on the detected outside air temperature.

4. The fuel cell vehicle as defined in claim 3, wherein:
   the controller further functions to:
   predict an air temperature change by correcting average air temperature change data for a current season based on a difference between an average air temperature for the present time and current season, and the detected outside air temperature; and
   predict the energy required to start the fuel cell system based on the predicted air temperature change.

5. The fuel cell vehicle as defined in claim 4, wherein:
   the controller further functions to:
   predict a period during which the outside air temperature drops below 0° C. from the predicted air temperature change;
   integrate the predicted air temperature over the period during which the predicted air temperature is below 0° C.; and
   predict the energy required to start the fuel cell system based on the integral value of the predicted air temperature over the period during which the predicted air temperature is below 0° C.

6. The fuel cell system as defined in claim 3, wherein:
   the controller further functions to:
   predict an air temperature change by correcting average air temperature change data for a current season based on a difference between an average air temperature for the current season and an average air temperature for the preceding day; and
   predict the energy required to start the fuel cell system based on the predicted air temperature change.

7. The fuel cell vehicle as defined in claim 6, wherein:
   the controller further functions to:

predict a period during which the outside air temperature drops below 0° C. from the predicted air temperature change;

integrate the predicted air temperature over the period during which the predicted air temperature is below 0° C.; and predict the energy required to start the fuel cell system based on the integral value of the predicted air temperature over the period during which the predicted air temperature is below 0° C.

8. The fuel cell system as defined in claim 3, wherein:

the controller further functions to:

predict an air temperature change by correcting average air temperature change data for a current season based on a difference between an average air temperature for the current season and an average air temperature for a plurality of preceding days; and predict the energy required to start the fuel cell system based on the predicted air temperature change.

9. The fuel cell vehicle as defined in claim 8, wherein:

the controller further functions to:

predict a period during which the outside air temperature drops below 0° C. from the predicted air temperature change;

integrate the predicted air temperature over the period during which the predicted air temperature is below 0° C.; and predict the energy required to start the fuel cell system based on the integral value of the predicted air temperature over the period during which the predicted air temperature is below 0° C.

10. The fuel cell vehicle as defined in claim 1, further comprising:

a sensor which detects a current position of the vehicle, wherein:

the controller further comprises a medium which records locations of fuel stations, and further functions to:

compare a distance from the current position to the nearest fuel station, and the predicted possible running distance, and give advice to refuel when the distance to the nearest fuel station is shorter than the predicted possible running distance.

11. The fuel cell vehicle as defined in claim 10, further comprising:

a speaker, wherein the controller further functions to give the advice to refuel by issuing an audio alarm to refuel from the speaker when the fuel cell system stops and the distance to the nearest fuel station is shorter than the predicted possible running distance.

12. The fuel cell vehicle as defined in claim 10, wherein:

the controller further functions to give advice to remove water supplied to the fuel cell when the fuel cell system stops and the distance to the nearest fuel station is shorter than the predicted possible running distance.

13. A method for predicting a possible running distance of a fuel cell vehicle provided with a fuel cell system, comprising:

detecting a remaining fuel amount in a fuel tank which stores fuel supplied to the fuel cell system; and predicting a possible running distance of the vehicle based on an energy amount obtained by subtracting an energy amount required to start the fuel cell system, from an energy amount corresponding to the detected remaining fuel amount.

14. A fuel cell vehicle, comprising:

a fuel cell system;

a fuel tank which stores fuel supplied to the fuel cell system;

means for detecting a remaining fuel amount in the fuel tank; and means for predicting a possible running distance of the vehicle based on an energy amount obtained by subtracting an energy required to start the fuel cell system, from an energy amount corresponding to the detected remaining fuel amount.

15. A fuel cell vehicle, comprising:

a fuel cell system;

a fuel tank which stores fuel supplied to the fuel cell system;

a sensor which detects a remaining fuel amount in the fuel tank;

a sensor which detects an outside air temperature; and a controller which functions to:

predict an air temperature change by correcting average air temperature change data for a current season based on a difference between an average air temperature for the present time and current season, and the detected outside air temperature;

predict a period during which the outside air temperature drops below 0° C. from the predicted air temperature change;

integrate the predicted air temperature over the period during which the predicted air temperature is below 0° C.;

predict an energy required to start the fuel cell system based on the integral value of the predicted air temperature over the period during which the predicted air temperature is below 0° C.;

predict a possible running distance of the vehicle based on an energy amount obtained by subtracting the energy required to start the fuel cell system, from an energy amount corresponding to the detected remaining fuel amount, and give advice to refuel when the predicted possible running distance is less than a predetermined running distance.

* * * * *